R. W. ERWIN.
ELECTRIC BATTERY.
APPLICATION FILED APR. 15, 1915.
1,295,459.
Patented Feb. 25, 1919.
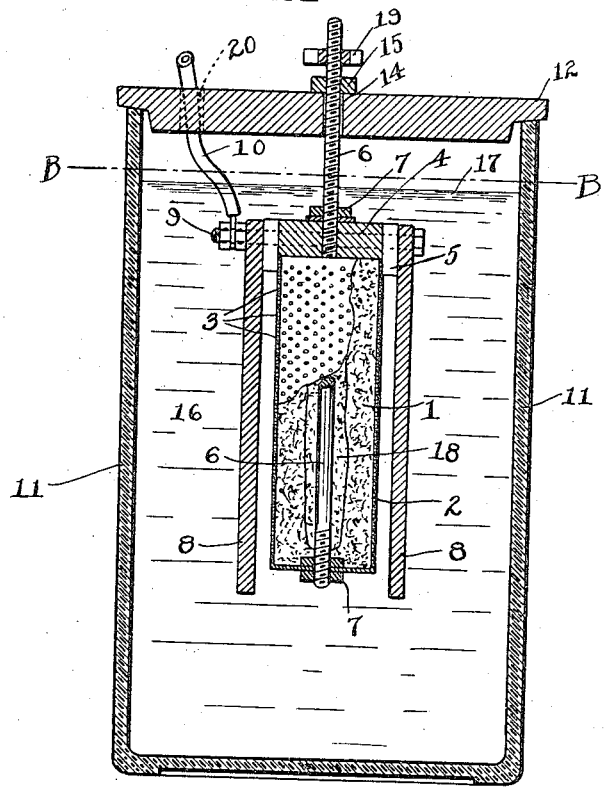
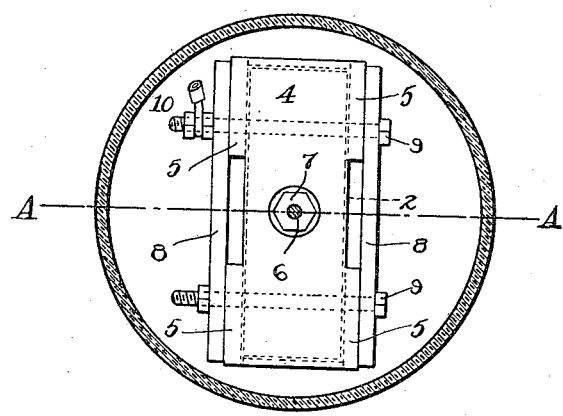
WITNESS
H G Grover
INVENTOR.
RAYMOND W. ERWIN
BY Ira J Adams
ATTORNEY

UNITED STATES PATENT OFFICE.

RAYMOND WILLIAM ERWIN, OF FREMONT, OHIO, ASSIGNOR, BY MESNE ASSIGNMENTS, TO NATIONAL CARBON COMPANY, INC., A CORPORATION OF NEW YORK.

ELECTRIC BATTERY.

1,295,459.

Specification of Letters Patent.    Patented Feb. 25, 1919.

Application filed April 15, 1915. Serial No. 21,535.

*To all whom it may concern:*

Be it known that I, RAYMOND WILLIAM ERWIN, a citizen of the United States, residing at Fremont, in the county of Sandusky and State of Ohio, have invented a certain new and useful Improvement in Electric Batteries, of which the following is a full, clear, and exact description.

My invention relates to primary batteries and more particularly to alkaline cells containing electrodes of zinc and copper oxid.

In such alkaline cells the copper oxid is used either in a flaky or powdery condition inside a perforated container or in a molded mass held together by a suitable binder. My invention relates particularly to the former type, though in regard to some aspects, it may be used with the latter.

One object of the invention is to prevent the granular or flaky oxid from sifting out through the perforated container during shipment and subsequent handling.

Another object is to construct the battery in such a way that there are fewer parts to be shipped when filling an order for the cells.

Other objects will appear in the appended description. Referring to the drawings, Figure 1 is a sectional elevation of an assembled battery taken on the line A—A of Fig. 2.

Fig. 2 is a sectional plan of the battery taken on the line B—B of Fig. 1.

The flaky or powdered copper oxid 1 is retained in the metal container 2 which has small perforations 3 to permit the ready access of the alkaline electrolyte. This perforated container is secured between depending lugs 5 of the insulating support 4 by means of a rod 6 and nut 7. To the insulating support are also secured zinc electrodes 8 by means of threaded bolts 9 in such a manner that they are arranged on opposite sides of the container and insulated therefrom.

This assembly of copper oxid and zinc elements is suspended from the cover 12 by a nut 15 on the rod 6 which passes through the central hole 14. The cover with the parts as thus assembled, rests on top of the jar 11 which is usually made of glass. Wing nuts 19 serve to attach a wire from the external circuit to the terminal rod 6. An insulated wire 10, passing through a hole 20 in the cover, is secured to one of the bolts 9 and serves for the negative terminal of the cell. The alkaline electrolyte, usually sodium hydroxid, fills the jar to the requisite height and is covered by a layer 17 of oil to prevent evaporation of the solution or its contamination by the carbon dioxid of the air, as well as to eliminate the creeping of salts up the side of the jar.

Cells constructed as just described are never shipped in a complete, assembled condition on account of difficulty in preventing the electrolyte from spilling out during shipping and subsequent handling. They have accordingly been shipped unassembled, and such shipments, prior to my invention, would contain a package of sodium hydroxid crystals, the electrode assembly, the cover, the glass jar and a bottle of oil. On receiving the shipment the user poured the requisite amount of water into the jar and dissolved the sodium hydroxid crystals therein. The cover with the suspended assembly was then placed in position and the oil poured over the top of the electrolyte.

In making these shipments considerable trouble has been experienced with the flaky or powdered copper oxid sifting out through the perforated container. There have been numerous proposals made to prevent this, one being to coat the perforated container, or bind the oxid together, with some material that will dissolve out in the electrolyte when the cell is assembled. Sugar has been suggested as a desirable coating or binding material, on the theory that it would remain neutral in the battery action and do no harm. I have found, however, that sugar, glue and other similar materials soluble in the electrolyte, are harmful in one way or another to the life of the battery. I therefore have used entirely different means for preventing the sifting out of the copper oxid. This consists in converting the depolarizer into a viscous mass by means of a liquid that is not soluble in the electrolyte but that will rise to the surface of the same when the battery is assembled by the user. As an example of such a material, I will mention ordinary engine oil, though other non-volatile mineral oils may also be used. Oil is especially suitable for this purpose as it automatically forms the necessary protecting layer at the top of the electrolyte in the assembled cell.

To carry out my invention I assemble the copper oxid element in the porous container in the usual way and then immerse it for four or five seconds in the oil. It is then removed and the excess oil allowed to drip off the container. By this process enough oil is absorbed to partially saturate the copper oxid, but a portion 18 of the oxid in the center is left in a dry condition. While the entire mass may be saturated with oil if desired, I find that it is preferable to leave the central part dry, so that it will absorb the excess oil from the outside portion and there will be no tendency for the oil to ooze out through the holes in the container when the element is stored or is being shipped. The oil in the copper oxid causes the particles to hang together and prevents their sifting out through the holes. The element can be kept in storage any length of time without destroying the efficient action of the oil and when it is placed in the electrolyte by the user, the oil of course does not dissolve out in the electrolyte but rises to the surface and automatically forms the protecting layer which is a necessary part of the assembled battery.

If the electrode assembly is immersed in cold electrolyte, it will take about an hour for the oil layer to form on the top, but if the electrolyte is hot it will form in about five minutes.

It would naturally be supposed that oil in the copper oxid would have a detrimental action on account of its insulating properties, but I have found that it not only has no objectionable action, but on the contrary has a beneficial effect by somewhat increasing the life of the cell.

The improvement just described is not only to prevent flaky or granular copper oxid from sifting out through the perforated container, but also to eliminate the separate bottle of oil in the shipment of the cell, or renewal, which likewise eliminates one operation in setting-up the cell for use. While I have described oil as a suitable material, particular reference being made to ordinary engine oil, other materials may be used without departing from the spirit of the invention. The necessary part of the improvement is the use of material that will not dissolve or mix with the electrolyte but will rise to the top on account of its lighter weight.

Having described my invention, what I claim is:—

1. A primary battery electrode consisting of pulverulent copper oxid soaked in a mineral oil.

2. In a primary battery, a porous container inclosing an electrode of pulverulent copper oxid moistened with a mineral oil.

3. In a primary battery, a perforated sheet metal container inclosing pulverulent copper oxid electrode material moistened with a mineral oil at the surfaces adjacent to said perforated container.

4. In a primary battery having a fluid electrolyte, a porous container inclosing an electrode of pulverulent material containing a mineral oil in sufficient quantities to float on the electrolyte when immersed therein.

5. In a primary battery, an alkaline electrolyte, a zinc electrode and a perforated sheet metal container inclosing pulverulent copper oxid containing a mineral oil.

In testimony whereof, I hereunto affix my signature.

R. WILLIAM ERWIN.